(12) United States Patent
Kaplan

(10) Patent No.: US 6,950,507 B1
(45) Date of Patent: Sep. 27, 2005

(54) SYSTEM FOR WORKING AT A REMOTE OFFICE PBX

(75) Inventor: Alan E. Kaplan, Morris Township, Morris County, NJ (US)

(73) Assignee: AT&T Corp., New York, NY (US)

( * ) Notice: Subject to any disclaimer, the term of this patent is extended or adjusted under 35 U.S.C. 154(b) by 366 days.

(21) Appl. No.: 10/026,080

(22) Filed: Dec. 22, 2001

(51) Int. Cl.$^7$ ............................................ H04M 15/06
(52) U.S. Cl. .......................... 379/142.01; 379/142.07; 379/225
(58) Field of Search ...................... 379/142.01, 142.07, 379/142.15, 127.01, 156, 105, 166, 93.01, 379/93.14, 201.01, 211.02, 229, 230, 212.01, 379/352, 355.01, 242, 221.15, 225, 227, 379/201, 219, 221.5; 455/414.1, 417, 555, 455/557; 370/401, 524, 352; 709/217

(56) References Cited

U.S. PATENT DOCUMENTS 5,764,639 A * 6/1998 Staples et al. .............. 370/401
5,818,919 A   10/1998 Berberich, Jr. et al.
5,875,240 A   2/1999 Silverman
6,359,892 B1 * 3/2002 Szlam ........................ 370/401
6,560,223 B1 * 5/2003 Egan et al. ................. 370/356

* cited by examiner

Primary Examiner—Curtis Kuntz
Assistant Examiner—Barry W Taylor
(74) Attorney, Agent, or Firm—Henry T. Brendzel

(57) ABSTRACT

An arrangement that includes at least two PBXs interconnected by a network employs CTI ports to control operation of the PBXs. Through such control, a user can set up a telephonic presence in a visited PBX such that, to the user and to all others who interact with the user, it appears that the user is at the user's office, rather than at an office that is served by the visited PBX. This is effected by forwarding calls that are destined to the user at the user's office to the visited PBX, and by translating all dialing commands of the user at the visited PBX, and acting upon the translated commands, so as to provide the user with the features available to the user at the user's office while presenting an appearance to called parties that the user is at the user's office.

15 Claims, 2 Drawing Sheets

US 6,950,507 B1

SYSTEM FOR WORKING AT A REMOTE OFFICE PBX

RELATED APPLICATION

This invention is related to application filed on Jun. 28, 2001, titled "An Arrangement for Work-at-Home Telecommunication Services," which bears the Ser. No. 09/894,173, and which is hereby incorporated by reference.

BACKGROUND OF THE INVENTION

This invention relates to telephony and, more particularly, to arrangements that offer virtual telephonic presence at a telephone that is coupled to a switch, such as a PBX.

Many employers have more than one location where they have offices. Moreover, many of theses offices are large enough to need a PBX to satisfy the telephonic needs of the employees in those offices. At times, an employee whose office is in location A needs to be at an office in location B for some period of time, and while there, wishes to conduct normal business. It is desirable to have it appear—to all with whom the employee interacts telephonically—that the employee is in the employee's office at location A.

It is noted that call transfer, where an employee at location A conditions the PBX at location A to transfer call that are directed to a particular extension to some other telephone, is known. However, it is not known how to create the general appearance, to both the employee and others with whom the employee interacts, that the employee is at her office in location A.

SUMMARY

In an arrangement that includes at least two PBXs and a network that interconnects the PBXs, an advance in the art is achieved through the user of a Computer Telephone Interface (CTI) port of the PBXs that are interconnected through a network. The CTI port of a PBX can provide information about its associated PBX, and can accept signals that control the PBX's operation. Means are provided in this arrangement to specify that the user's telecommunications presence in the user's home PBX is transported to another, visited, one of the PBXs, and to condition the arrangement for the user's telecommunication interactions with the visited PBX. More specifically, a process is established that allows the user to interact with the visited PBX in the same manner as if the user were in the user's home PBX, and achieving precisely the same results. This allows others to reach the user at the visited PBX as if the user were interacting with the user's home PBX. Stated differently, a process is established for the user to have a virtual presence in the user's home office (interacting with the home PBX), while the actual presence of the user is at a visited office (interacting with a visited PBX). This is accomplished by providing the visited PBX with access to means that translates all actions taken by the user in the visited PBX and informs the visited PBX how to response to the user actions. The home PBX is provided with a means for transferring calls that are destined to the user in a manner that hides from calling parties that the user actually interacts with the visited PBX.

In an illustrated embodiment, the CTI ports of the PBXs are interconnected through a digital network, and the translation means is a separate computer that is also connected to the digital network. Separate means are provided in the illustrated embodiment for conditioning the user's home and visited PBX for the virtual telecommunications presence.

DETAILED DESCRIPTION

Figure 1:
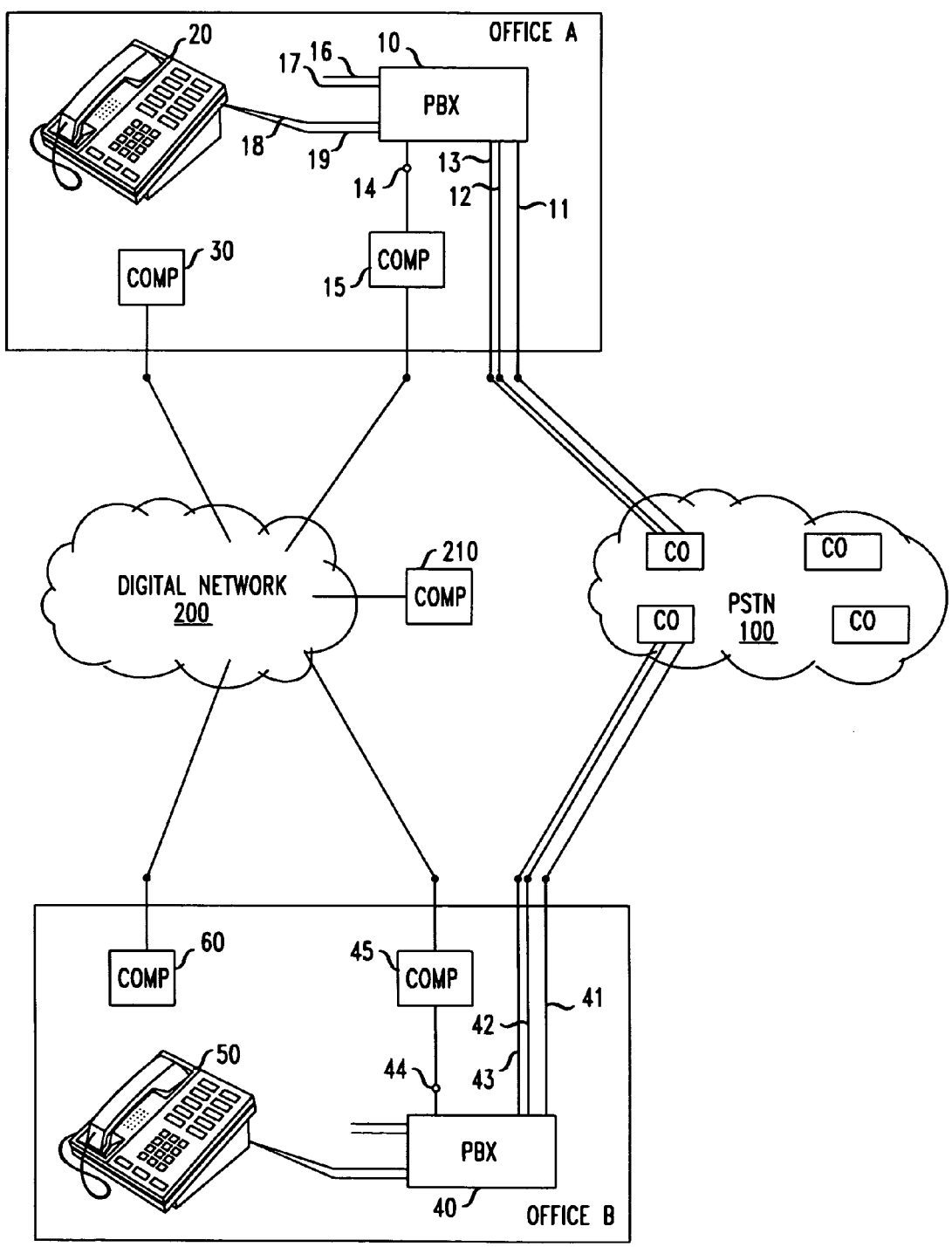
FIG. 1 presents one block diagram of an arrangement in conformance with the principles disclosed herein.

FIG. 1 depicts an arrangement that includes a location A of some enterprise (for example, AT&T), and a location B of the same, or a different, enterprise. Locations A and B are coupled to each other via Public Switched Telephone Network (PSTN) 100 and a digital network 200. Location A comprises a PBX 10 that includes a set of trunks 11, 12, and 13 through which the PBX is coupled to central office 150 in PSTN 100. PBX 10 also includes lines 16–19 through which telephones are connected to the PBX, and one of them is telephone 20. Prior art telephones exist that allow connection to more than one line of PBX 10, and in the FIG. 1 arrangement, telephone 20 illustratively is connected to lines 18 and 19. Each line of PBX 10 is physically extended to some employee office within location A and has a number (or numbers) that is (are) associated with the telephonic instrument that is in the office, and with the employee who is assigned to that office. For example, telephone number 534-123-8888 may be assigned to telephone 20 in Alice's office A in location A, that being Alice's "home" office.

PBX 10 also includes a CTI port 14, through which the functionality of the PBX can be controlled pursuant to an established protocol. PBX's with a CTI port are readily available in the prior art; for example, the DEFINITY® family of PBXs sold by Lucent Technologies, Inc. CTI port 14 is connected to digital network 200 through computer 15, which forms a gateway that allows access to port 14 only for bona fide communication. More specifically, computer 15 performs three functions: (1) encryption and decryption of communication messages to insure that communication messages via digital network 200 are secure, (2) protocol conversions from whatever protocol is employed in messages arriving at computer 15 to the particular Application Programming Interface (API) that is used by PBX 10 at port 14, and (3) authentication, making sure that the party that accesses PBX 10 via port 14—in order to obtain information from PBX 10 or to control operation of PBX 10—is authorized to get the sought information or to exercise the desired control. The operation of computer 15 is completely conventional.

For purposes of this disclosure, it is assumed that PBX 10 offers numerous conventional features to telephone 20. One such feature is that each time telephone 20 originates a call over one of the lines by which it is connected to PBX 10, the PBX a generates a signal (caller ID signal) that transmits Alice's telephone number to the called party. Another feature is that a call that goes unanswered for a certain number of rings is routed to a messaging platform that, effectively, forms an integral part of PBX 10. The messaging platform offers the calling party the opportunity to leave (record) a message for Alice, or to be transferred to another party, such as Alice's secretary. When a message is stored for Alice, PBX 10 is adapted to provide an indication at telephone 20 that a message is waiting, for example by lighting a "message waiting" light. Alice can retrieve stored messages from any extension of PBX 10 by simply dialing an extension number and providing a password. Yet another feature that is available in most PBXs is that any telephone that is connected to PBX 10 can call any other telephone that is connected to PBX 10 by simply dialing the extension number (typically, the last four digits of the telephone number) of the called party. Other features are also possible, such as abbreviated dialing, speed dialing, directory-assistance (finding the extension number of a person who has a telephone assigned on PBX 10), etc.

In the FIG. 1 embodiment, location A includes one or more computers that are connected to digital network 200, such as computer 30, to enable interactions with CTI port 14 and with the CTI ports of other PBXs, as described more detail below. Computer 30 may be located, for example, in office A.

Location B is similar to location A in that it includes PBX 40 to which telephone 50, located in office B of location B, is connected. PBX 40 is connected to PSTN 100 via trunks 41, 42, and 43, and is connected to digital network 200 via CTI port 44, through gateway computer 45. In addition, location B includes computer 60 that is connected to network 200, possibly located in the office B.

Lastly, the embodiment shown in FIG. 1 includes computer 210 that is coupled to digital network 200. This computer is, effectively, a go-between computer that relieves some of the processing burdens that would otherwise be imposed on PBXs 10 and 40 (and potentially many other PBXs that are coupled to the networks 100 and 200). It should be understood, however, that computer 210 is included in the FIG. 1 embodiment for illustrative purposes, and that embodiments that do not use computer 210, but rather rely on the processing power of the processors attached to the PBXs, are also viable. It should also be understood that use of digital network 200 is, likewise, illustrative, and that the same functionality can be achieved exclusively with PSTN 100 (e.g., with modems interfacing computers 30, 15, 45, and 60 to PSTN 100)—provided, however, that the connections between elements 210, 14, and 44 are always "on." In other words, the functionality of network 200 is served by any means that provides security and requires no action such as dial-up (not counting authentication processes) before communication can proceed. For purposes of this disclosure, such a means is a connectionless network. A network 200 that is separate from PSTN 100 can be the Internet, a private network, or a virtual private network. Of course, when network 200 is inherently secure, encryption and decryption at the gateway computers can be dispensed with.

As indicated above, it is desired to provide a means, and a process, by which Alice can be present in a visiting office, such as office B within location B, where telephone 50 is connected to PBX 40, but yet, in her telecommunications interactions, it should appear—to her and to others—as if she is in office A. Effectively, it is desired for Alice to be virtually present in office A while being physically present in office B. Creating this virtual presence is effected with a set-up process that modifies operation of the PBX in Alice's usual office in location A, i.e., PBX 10, modifies operation of the PBX in the visited office, and installs information in computer 210. The set-up process can be executed from any computer that is connected to digital network 200, such as computer 30 in office A or computer 60 in office B. It can also be executed from computer 210 directly. However, only authorized persons can initiate such a process, and the authorized persons have a strictly defined range of controls that they can effect. For example, it may be arranged that only Alice is authorized to condition PBX 10 and computer 210 to transfer her virtual presence away from telephone 20 in office A, but also arranged that Alice can so condition PBX 10 only with respect to telephone 20. Advantageously, it is arranged that if a person is found to be authorized to move a virtual presence away from some telephone, that person is also authorized to install a virtual presence in any desired extension of any visited PBX, provided that the visited PBX (e.g., PBX 40) is conditioned to allow importing a presence to the desired extension (e.g., the extension of telephone 50).

Figure 2:
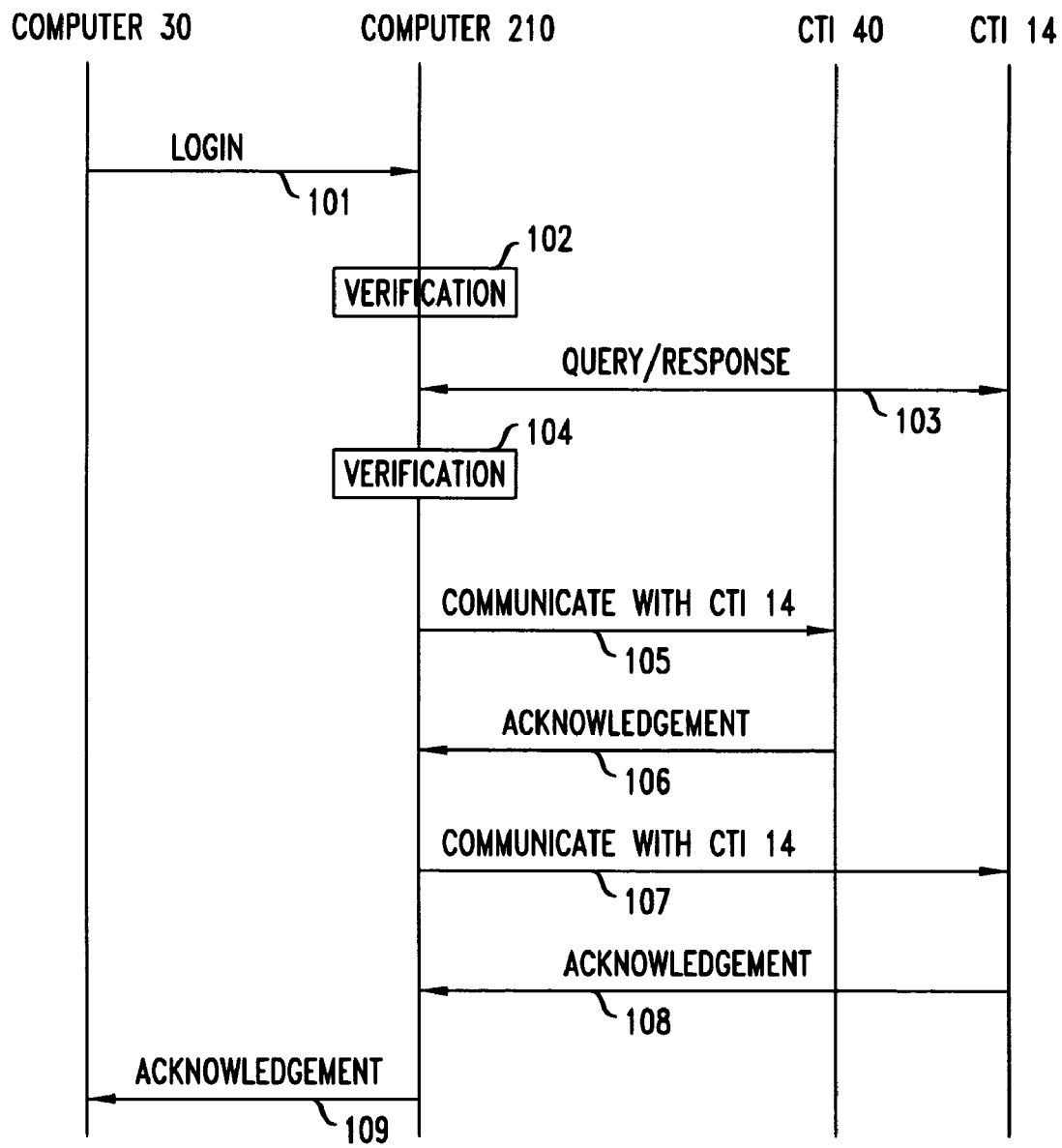
FIG. 2 presents a time line chart of messages and processes in accord with the principles of this invention.

Thus, the virtual-presence operation of the FIG. 1 arrangement begins when Alice decides to leave office A and go to office B and, accordingly, initiates a set-up for her presence in office B. As indicated above, this set-up can be initiated from any computer that is connected to network 200 but, most conveniently, it is initiated from computer 30 in office A, or from computer 60 in office B. FIG. 2 presents one flowchart for a set-up process in accordance with the principles of this disclosure, assuming that Alice initiates the set-up from office B, i.e., from computer 30.

The process starts with Alice logging into computer 210 (step 101), identifying herself to computer 210 and requesting a "presence modification" from her usual office (in location A) telephone (534-123-8888) to a visitor office B in location B that, for example, has the telephone number 456-789-1111. Log-in step 101 can be a single interaction, where Alice provides an name, her password, her usual office (in location A) telephone number, and the visitor office (office B) telephone number, and computer 210 verifies in step 102 that Alice is who she said she is. Step 101 can also involve a number of interactions; for example, with computer 210 issuing a challenge, and Alice providing a response. Whatever method is employed, verification step 102 simply determines whether Alice is who she says she is. Thereafter it is necessary to verify whether Alice is authorized to modify operation of PBX 10 (vis-à-vis her extension on PBX 10). To perform this verification, computer 210 sends a query to PBX 10, providing it with Alice's ID and the telephone number of her usual office in location A (step 103). PBX 10 responds, confirming (or not confirming) that Alice is authorized to modify operation of PBX 10 vis-à-vis her extension on PBX 10; to wit, 534-123-8888. This step of confirming can also be performed by gateway computer 15 (with the aid of a prior installation of the appropriate data from PBX 10. Step 104 assesses the response of PBX 10, and if the response is positive, computer 210 proceeds to contact the PBX of the visited office to query whether the telephone of the office B that Alice provided to computer 210 (which for purposes of this disclosure is telephone 50), is available to be used as a visitor office telephone with an imported presence. This query is made with message 105 to CTI port 44 of PBX 40, informing PBX 40 that it is desired to have a visitor at telephone 456-789-1111, where that visitor has a usual office (in location A) telephone number of 534-123-8888. If telephone 50 is permitted to have an imported presence, PBX 40 installs the provided information and sends an affirmative response to computer 210 in step 106. PBX 40 also conditions itself to access computer 210 for translations of all commands to telephone 50 that are other than digit strings that begin with a "9" (when use of a "9" prefix designates conventional outgoing calls).

It should be mentioned that the communication to CTI 44 must, of course, pass through gateway computer 45 in the manner described above. Specifically, computer 210 must employ encryption, and must log-in into computer 45 to demonstrate its authority to interact with PBX 40. The same holds true for when computer 210 wishes to interact with CTI 14, through gateway computer 15, or when PBX 10 wishes to send information to PBX 40 (or vice versa).

When computer 210 receives an affirmative response from PBX 40, computer 210 then initiates a two-way communication session with PBX 10, via CTI port 14, informing PBX 10 that the porting of Alice's telecommunications presence to PBX 40 is successful and that, henceforth, Alice can be reached at 456-789-1111. In the course of this communications, all information that may be necessary in order to satisfy Alice's telecommunication needs at office B in the virtual presence manner described above, is transferred to computer 210. Upon successful completion of this communication session and a receipt of a final acknowledgement from PBX 10 (step 108), computer 210 sends an acknowledgement message to computer 30 (step 109), informing Alice that the requested presence at 456-789-1111 has been established.

To illustrate the operation of the FIG. 1 arrangement, a number of specific scenarios are presented below for when Alice is present in office B and the above-described set-up process has been executed. These scenarios are illustrative, and do not purport to constitute the entire set of capabilities of the FIG. 1 system.

One of the basic operations relates to calls that are directed to Alice at PBX 10, which can originate from outside the PBX or from an extension of PBX 10. In accord with the principles disclosed herein, when a call is directed to Alice's extension in PBX 10, the PBX recognizes that Alice is elsewhere, and consequently initiates a conventional call transfer to the telephone specified by Alice and stored in PBX 10 during the above-described set-up process. The call transfer is effected by PBX 10 dialing out, for example, on trunk 12, the appropriate number to its central office 150, and central office 150 initiates a process that causes central office 160 to seize an available PBX 40 trunk and ring telephone 50.

Concurrently, PBX 10 acquires the caller ID of the call that is incoming for Alice, and forwards that information to PBX 40 through a communication message from CTI port 14 to CTI port 44. In this manner Alice is provided with a ringing signal and a caller ID, indicating an incoming call, exactly as if she were to be receiving that incoming call in her usual office in location A.

Alternatively, PBX 10 first captures the caller ID of the incoming call, and then proceeds to transfer the call as described above, but with the captured caller ID being supplied to central office 150, rather than the caller ID of telephone 20 (or some other caller ID that PBX 10 might supply). The connection to central office 150 is via a "line side" trunk, and CO 150 simply passes the caller ID information along to central office 160 to be injected into the ringing signal applied to PBX 40. This assumes that CO 150 does not perform a check of the caller ID signal, or is caused to not perform such a check.

While Alice is provided with ringing signal at telephone 50, central office 150 provides audible ring-back signal to trunk 12 and, possibly, supervision signals. Whether through the supervision signals or through a conventional detection of ceasing of the ring-back signal, PBX 10 is informed when Alice goes off hook at telephone 50, in which event, PBX 10 bridges the incoming call to trunk 12, allowing Alice to converse with the calling party.

While PBX 10 listens to the ring-back signals on trunk 12, it counts the number of ringing intervals and, when a preselected number of ringing intervals are detected, PBX 10 concludes that Alice is not available, and connects the incoming call to an associated messaging platform, concurrently terminating the outgoing call on trunk 12. Typically, the messaging platform gives the calling party some options, such as being connected to another person (typically, the secretary of the called party), or leaving a message; and in the FIG. 1 arrangement, PBX 10 proceeds conventionally to carry out the processes responsive to the calling party's selection.

When the calling party leaves a recorded voice message for Alice, PBX 10 is typically conditioned to inform Alice of the fact that a message is stored for her. In some realizations, PBX 10 lights a "message waiting" light on Alice's telephone. In other realizations, PBX 10 is adapted to provide an unusual dial tone when telephone 20 goes off hook. In accord with the principles disclosed herein, PBX 10 causes CTI port 14 to send a message to CTI port 44, informing PBX 40 of the fact that Alice has a stored message in the messaging platform associated with PBX 10. PBX 40, in turn, lights a "message waiting" light on telephone 50, or conditions itself, as appropriate, to communicate to Alice that she has a waiting message.

Relative to incoming call, the only effective exception to the above occurs when a party at some telephone of PBX 40 dials the actual four-digit extension of telephone 50. In such a case, PBX 40 operates conventionally, in the sense that it makes the connection, but it sends a caller ID signal to telephone 50 that corresponds to the full telephone number of the calling party, rather than merely the extension of the calling party.

While Alice is in office B, she might wish to call Bob, who is in an office in location A and, hence, serviced by PBX 10. Assuming that when Alice is in office A she can reach Bob by simply dialing a four-digit extension number, then, in accordance with the objective of this invention, it is desired that Alice should be able to connect to Bob from office B by dialing the same four-digit extension. The FIG. 1 arrangement easily provides this capability because PBX 40 maintains Alice's identifier in its memory (i.e., Alice's telephone number), as well as a directive to consult with computer 210 in response to all commands from telephone 50 other than conventional outgoing calls (designed by a "9" initial digit). Thus, when Alice goes off hook and dials Bob's four-digit extension, PBX 40 recognizes that she is dialing an extension in the PBX that corresponds to Alice's office A, and knows that the area code and the exchange of that PBX is already stored in PBX 40 with reference to Alice's identifier. Accordingly, PBX 40 takes that information from its memory (i.e., the number sequence 534-123), appends a "1" if necessary, and proceeds to make a call in a conventional manner, but presents to central office 160 Alice's identifier as the caller ID signal. Alternatively, Alice goes off hook and dials Bob's four-digit extension, PBX 40 recognizes a translation is called for, sends a message to computer 210, via CTI port 45, identifying Alice and specifying the four-digit extension that she dialed. Based on Alice's identification, and Alice's calling plan that computer 210 received in the course of the initial set-up (step 107), computer 210 returns Bob's full telephone number. In response, PBX 40 dials out Bob's telephone number to central office 160 in a conventional manner, but presents to central office 160 Alice's identifier as the caller ID signal. The caller ID information presented to central office 160 is communicated to the called party (in this case, Bob), and when PBX 10 rings Bob's telephone, it provides Bob with the caller ID that corresponds to Alice's telephone number that PBX 40 outputted. As in the case of forwarded calls, it is assumed that CO 160 does not perform a check of the caller ID signal, or is caused to not perform such a check.

In an enhancement, the response from computer 210 might include a flag that directs PBX 40 to output only a part of Alice's identifier, i.e., only the extension number, when the called party is a party at PBX 10. In this manner, a called party at PBX 10, such as Bob, would receive a four-digit caller ID, whereas called parties at other than PBX 10 would receive a 10-digit caller ID.

It is noted that communication with computer 210 that is initiated by CTI gateway computers is, by design, authorized communications and, therefore, the authentication steps described above in connection with the set-up process can be dispensed with.

As indicated above, Alice might have various other features when she operates telephone 20 in office A, such as dialing *NN (N stands for any digit 0–9) to reach members of her work group (abbreviated dialing), #NN to dial out a pre-stored number (speed dialing), and/or pressing buttons other that the dial-pad buttons to obtain special services, such as connecting to her secretary, initiating a search though the PBX's directory for the extension of a particular individual, reaching the messages platform to retrieve stored messages, etc. In all of these situations, PBX 40 sends a message to computer 210 that describes the action taken at telephone 50. Computer 210 translates that action, as necessary, and provides instructions to PBX 40 regarding the responsive actions that PBX 40 must undertake. In short, PBX 40 is caused to offer Alice a facsimile of her usual PBX calling plan, where the term "calling plan" encompasses the features that Alice enjoys at telephone 20, and the adjective "facsimile" intents to convey the notion that because of limitations in telephone 50, Alice might not be able enjoy all her usual PBX calling plan features. For example, telephone 20 may have a separate button in its upper right hand corner for hailing Alice's secretary. Telephone 50 might not have such a button, or may have such a button in a different place on the telephone's face.

As for conventional outgoing calls (dial strings that begin with a "9"), PBX 40 does not need to access computer 210 but it, nevertheless, employs Alice's telephone number as the caller ID signal for all outgoing calls.

Lastly, it may be advantageous to allow Alice to depart from her virtual presence in office A, for example, in order to reach Tom at some extension of PBX 40 by dialing merely a four-digit extension. This can be easily accomplished by causing PBX 40 to temporarily revert to its pre-"set up" condition in response to a selected dialed sequence, such as ##.

The above discloses the principles of this invention by means of an illustrative embodiment. It should be realized, however, that many modifications can be effected to create different embodiments, without departing from the spirit and scope of this invention. For example, when PBXs 10 and 40 have sufficient processing capacity within the processors that are already in the PBXs, or when PBXs 10 and 40 are augmented with adjunct processors, the information stored in computer 210, and the actions performed in computer 210 can be performed locally. This has the advantage, of course, of eliminating whatever delay is encountered in communicating with computer 210 across network 200, and delays in computer 210 (keeping in mind that computer 210 may be called upon to handle the work for many PBXs in numerous locations). To give another example, Alice might specify to computer 210 more than one visitor office when she might be found. The operation of such a system is basically the same as described above, except that the call forwarding is replaced with a broadcast, where all of the visitor offices ring simultaneously. The telephone that goes off-hook first is concluded to be the one to which the call is to be transferred (stopping the ringing in the other visitor offices). To give yet another example, the arrangement depicted in FIG. 1 employs PBXs, but the principles disclosed herein apply to other switching elements as well, for example arrangements where PBX-like services are provided through network switches (e.g., Centrex Service).

What is claimed is:

1. An arrangement comprising:
   a switching network;
   a digital network;
   a first PBX including
     trunks connected to said switching network,
     lines adapted to operate with telephonic instruments,
     a first processor for controlling operation of the first PBX,
     a first memory associated with said first processor, and
     a digital port coupled to said first processor, through which information contained in said first PBX can be accessed, and through which control signals can be applied to store in said first memory and thereby control manner of operation of said first PBX;
   a first security processor for coupling the digital port of said first PBX to said digital network, for insuring that only bona fide messages pass through to said digital port from said digital network;
   a second PBX including
     trunks connected to said switching network,
     lines adapted to operate with telephonic instruments,
     a second processor for controlling operation of said second PBX,
     a second memory associated with said second processor, and
     a digital port coupled to said second processor through which information contained in said second PBX can be accessed, and through which control signals can be applied to store in said second memory and thereby control manner of operation of said second PBX; and
   a second security processor for coupling the digital port of said second PBX to said digital network, for insuring that only bona fide messages pass through to said digital port from said digital network;
   wherein said first memory contains a calling plan module that specifies telecommunication capabilities of line A of said first PBX, and a directive that specifies a line B in said second PBX that is to be used instead of line A, and said second memory contains a directive that line B is to be treated as if it is line A, and a module associated with line B that contains a facsimile of said calling plan module contained in said first memory.

2. The arrangement of claim 1 where said first security processor and said second security processor perform decryption of messages arriving from said digital network.

3. The arrangement of claim 2 where said second processor includes a module that translates signal activations by a telephonic instrument connected to line B to develop control signals for said second PBX that implement said calling pan of said line A, as specified in said second memory.

4. The arrangement of claim 2 where said first security processor carries out an authentication process, and a format conversion process.

5. The arrangement of claim 2 further comprising a go-between processor coupled to said digital network that is interposed in the signals flow between said first security processor and said second security processor for performing format translation and encryption of communication.

6. The arrangement of claim 1 where said module contained in said second memory includes caller ID information of line A.

7. The arrangement of claim 1 where said second network is a packet network, a private network, a virtual private network, or subsumed by said switching network.

8. A method for providing virtual telephonic presence at a first telephonic instrument served by a first PBX while physically present at a second telephonic instrument served by a second PBX, comprising the steps of:

said first PBX receiving a request, on behalf of line B of said second PBX, to provide a calling plan of line A of said first PBX which describes telecommunication capabilities of a telephonic instrument connected to said line A;

installing in said first PBX information about said line B of said second PBX, including a directive that said line B is to be used in all communications pertaining to said line A;

said fist PBX delivering said calling plan of said line A to said second PBX;

installing in a memory accessible by said second PBX, in association with said line B, said calling plan pf said line A, a directive to provide service to said line B in accord with said calling plan of said line A, and information that allows outgoing calls from said line B to provide caller ID information of said line A;

and said first PBX and said second PBX cooperating to provide to said line B outgoing and incoming telecommunication service in accord with said calling plan of line A and in a manner that is transparent to users.

9. The method of claim 8 where said step of receiving a request receives an encrypted request, and said method further includes a step of decrypting said request.

10. The method of claim 9 further executing a process for authentication of authority of party from whom said request is received to make said request.

11. The method of claim 8 further comprising:

said first PBX receiving a call from party X, destined to line A;

said fist PBX sending a message to said second PBX to ring line B;

said second PBX ringing line B;

said second PBX informing said first PBX of a ringing-no-answer condition at line B; and said first PBX connecting said party X to a messaging platform associated with said first PBX.

12. The method of claim 8 where said memory accessible by said second PBX that is part of said second PBX, an adjunct of said second PBX, or is remote to said second PBX and is reachable by said second PBX through a network.

13. A method for providing virtual telephonic presence at a line A of a first PBX while physically present at a telephonic instrument connected to line B of a second PBX, comprising the steps of:

receiving a connection request at said telephonic instrument;

determining that a directive exists with respect to said telephonic instrument that a foreign calling plan is to be emulated, which foreign calling plan is a calling plan for line A, previously obtained from said first PBX and installed in said second PBX to be associated with said line B;

translating said connection request in accordance with information regarding said calling plan to create translated connection request; and undertaking to establish a connection pursuant to said translated connection request.

14. The method of claim 13 where said information regarding said calling plan is accessed in course of said translating from memory of said second PBX, from memory of a processor that is an adjunct of said second PBX, or from memory of a processor that is reachable by said second PBX through a network.

15. The method of claim 13 where said information regarding said calling plan is accessed in course of said translating from memory of a processor that is an adjunct of said second PBX, or from memory of a processor that is reachable by said second PBX through a network, and said translating is performed by said processor.

* * * * *